United States Patent [19]
Guzzoni

[11] Patent Number: 5,161,788
[45] Date of Patent: Nov. 10, 1992

[54] SET OF MODULAR ANCHORING ELEMENTS FOR MOUNTING A FLUID-OPERATED WORKPIECE-CLAMPING ELEMENT ON A SUPPORTING PALLET

[75] Inventor: Giorgio Guzzoni, Brescia, Italy

[73] Assignee: Salvagnini S.p.A., Sarego, Italy

[21] Appl. No.: 651,529

[22] Filed: Feb. 6, 1991

[30] Foreign Application Priority Data

Feb. 9, 1990 [IT] Italy .................. 19329 A/90

[51] Int. Cl.⁵ .............................. B23Q 3/08
[52] U.S. Cl. ........................ 269/24; 269/20; 269/27; 269/289 R
[58] Field of Search ............ 269/37, 303, 304, 305, 269/289 R, 309, 311, 315, 319, 27, 20, 29

[56] References Cited

U.S. PATENT DOCUMENTS 4,261,558  4/1981  Carossino ..................... 269/134

FOREIGN PATENT DOCUMENTS 041051  12/1981  European Pat. Off.
320027   6/1989  European Pat. Off.
0276249  2/1990  Fed. Rep. of Germany ... 269/289 R
1240320  7/1960  France

OTHER PUBLICATIONS

PCT Application-WO 9008622 Aug. 1990.

Primary Examiner—Bruce M. Kisliuk
Assistant Examiner—Eileen Morgan
Attorney, Agent, or Firm—Cushman, Darby & Cushman

[57] ABSTRACT

A set of anchoring elements including a first and a second anchoring element of modular type, usable either as an alternative to or in combination with one another in relation to the requirements of height adjustment of a clamping fixture's components. Each of the anchoring elements includes a hollow external casing provided with a hollow threaded screw for its fastening to an underlying anchoring element or to a supporting pallet for a piece which is to be machined, and a hollow threaded bush for the fastening of a clamping fixture's anchoring element or active component located immediately above. The first and the second anchoring element are provided with structure suitable for preventing their rotation with respect to the underlying anchoring element, or supporting pallet. Moreover, the second anchoring element includes a hollow internal casing in which the threaded bushing is housed, which is axially slidable with respect to the external casing for the adjustment in height of the upper component or anchoring element located immediately above.

5 Claims, 3 Drawing Sheets 5,161,788

SET OF MODULAR ANCHORING ELEMENTS FOR MOUNTING A FLUID-OPERATED WORKPIECE-CLAMPING ELEMENT ON A SUPPORTING PALLET

BACKGROUND OF THE DISCLOSURE

The present invention relates to a set of anchoring elements of adjustable type for components of pieces clamping fixtures on a supporting pallet.

This invention relates more precisely to an improvement of the object of the Italian patent application No. 22932 A/87 dated Dec. 10, 1987, which relates to a pallet with an adjustable anchoring system for the preparation of the fixture for clamping a rough piece to be machined with machine tools. (That application corresponds to U.S. patent application Ser. No. 07/278,717, filed Dec. 2, 1988, which was abandoned in favor of continuing U.S. patent application Ser. No. 07/684,507, filed Apr. 15, 1991.)

In particular, in the mentioned patent application, there is disclosed a pallet which comprises one or more supporting faces provided with holes suitably threaded for screwing and unscrewing inside them, and thus for the simultaneous adjustment in height and angular orientation, of respective anchoring elements for active components of the clamping fixture.

The active components of the clamping fixture are associated to the anchoring elements by screwing both directly and through passive intermediate modular elements which merely serve as a connection between the anchoring elements and the active components.

Both the anchoring elements and the intermediate elements of the clamping fixture are internally hollow, to allow the passage of the operating fluid of the active component, fed through appropriate channels inside the pallet.

According to the abovementioned prior art, the two different adjustments, angular and in height, respectively, are not only bound one to the other, but are also executed by devices, such as the anchoring elements, which, in the clamping fixture as a whole, that by means of several intermediate modular elements being positioned one above the other can rise considerably above the pallet's supporting face, are at the lowest level and far from the active components. It is thus difficult in practice to contain within a restricted range of tolerances the angular orientation of the active modular element (be it clamping or supporting), which is at the top of the pile of modular elements, due to errors in machining the threads, to differences in the tightening of the threads, and to any dirt between the abutments.

In addition, in the apparatus disclosed in the above-identified application, when an active component of the clamping fixture which is screwed on an anchoring element is unscrewed, it can occur, due to random differences in the friction between the threads, that the active component actually becomes unscrewed from the anchoring element. It can also occur that the anchoring element becomes unscrewed from the seat in which it is screwed down and remains attached to the active component, thus requiring further and unprogrammed unscrewing and handling operations.

SUMMARY OF THE INVENTION

An object of the present invention is to overcome the mentioned drawbacks, in the first place by separating the two adjustments in height and angular orientation.

Another object is that of making it almost impossible for premature and undesired unscrewing of an anchoring element to occur when a clamping fixture's active component located immediately above is removed.

According to the invention such objects are attained by means of a set of anchoring elements of adjustable type for active components of pieces clamping fixtures on a supporting pallet, characterised in that the set comprises a first and a second anchoring element of modular type usable either as an alternative to or in combination with one another in relation to the requirements of height adjustment of a clamping fixture's active components. Each anchoring element comprises a hollow external casing provided with a hollow threaded screw for its fastening to an underlying anchoring element or to a supporting pallet for the piece to be machined and a hollow threaded bush for the fastening of a clamping fixture's anchoring element or active component located immediately above. The anchoring elements are provided with means suitable for preventing their rotation with respect to the underlying anchoring element or supporting pallet. The second anchoring element also comprises a hollow internal casing in which the threaded bush is housed. The hollow internal casing is axially slidable with respect to the external casing for the adjustment in height of the upper anchoring component or element located immediately above.

Preferably an adjustment ring nut cooperates with the internal casing and the external casing of the second anchoring element for reciprocal positioning in the selected axial position.

Directly over the abovementioned anchoring elements, it is possible to place the active components of the clamping fixture, if accomplished with the possibility of adjusting the angular orientation. Otherwise, there is provided a third anchoring element which may be placed over the second anchoring element and which, in turn, may be oriented in an adjustable manner with respect to them.

In other words, the single anchoring element, in which adjustable in height and in angular orientation, in the abovementioned prior art device is replaced by several modular anchoring elements, each of which has a different function. The first anchoring element essentially serves as a support for the second and/or third anchoring element, which may in turn be used for the determination of the desired adjustment of height and angular orientation, respectively. If only the adjustment of height is required and the piece to be clamped has a limited height, the second anchoring element can be screwed directly into the pallet, dispensing with the first and third element; if the piece is taller, it is possible to use the first element, or more than one first element, to increase the height of the set of anchoring elements and to arrange the active component at the desired height.

There is obtained in this way the independence of the two adjustments of height and angular orientation, and at the same time, premature and undesired unscrewing of an anchoring element is avoided. Moreover, the anchoring elements, since they extend in height so as to replace the known intermediate elements of the clamping fixture, may be inserted directly under the active components of the fixture itself, so that the angular orientation of the components themselves may be accurately fixed.

BRIEF DESCRIPTION OF THE INVENTION

The features of the present invention is made more evident by an embodiment illustrated as a non-limiting example in the attached drawings, wherein.

DETAILED DESCRIPTION

Figure 1:
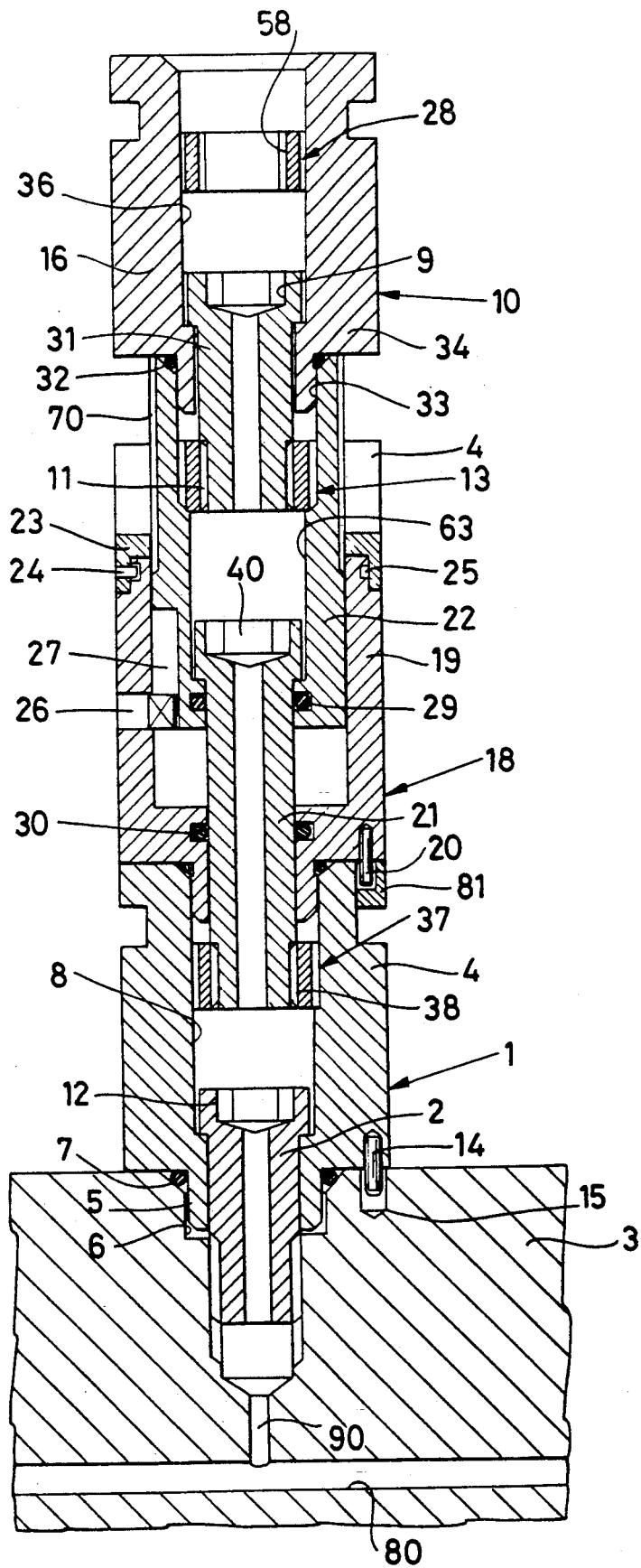
FIG. 1 shows an axial sectional view of a first, second and third anchoring element piled one above the other on a supporting pallet to receive a component of a piece clamping fixture on a supporting pallet.

With reference to FIG. 1, a first anchoring element 1 is shown fastened by a drilled coaxial screw 2 having a hexagonal socket head 12, to an underlying part, which may be a pallet 3 of the type illustrated in the aforesaid patent application, or to another anchoring element. Such element 1 has an internally hollow external casing 4, which terminates with a lower tang 5 which is inserted, with small clearance, in a corresponding cylindrical cavity 6 of the pallet 3 to ensure a well-defined position for it. A gasket 7 which is arranged in the proximity of the entry of the cylindrical cavity 6, ensures the seal of the clamping fixture's control fluid, supplied through internal channels 80 of the pallet 3, from which there branches out a plurality of vertical conduits 90 which lead into respective cavities 6. There is further inserted in the lower extremity of the casing 4, a vertical pin 14 which, being housed with clearance in a hole 15 of the pallet 3, prevents the rotation of the casing 4 during the unscrewing stage of the upper anchoring elements and of the active component (not shown, but which can be of the kinds shown in the aforementioned prior application) located at the top of the same.

Inside the casing 4, there is a cavity 8, which is in part conical for sealing purposes, in part cylindrical for centering a second anchoring element 18 and in part threaded for fastening a bushing 37 provided with internal threads 38, used for fixing a coaxial screw 21 of the anchoring element 18. Moreover, at the upper extremity of casing 4, there is a cavity 35 which is suitable for receiving the angular orientation fastening pin of a possible anchoring element placed immediately above the anchoring element 1.

Figure 2:
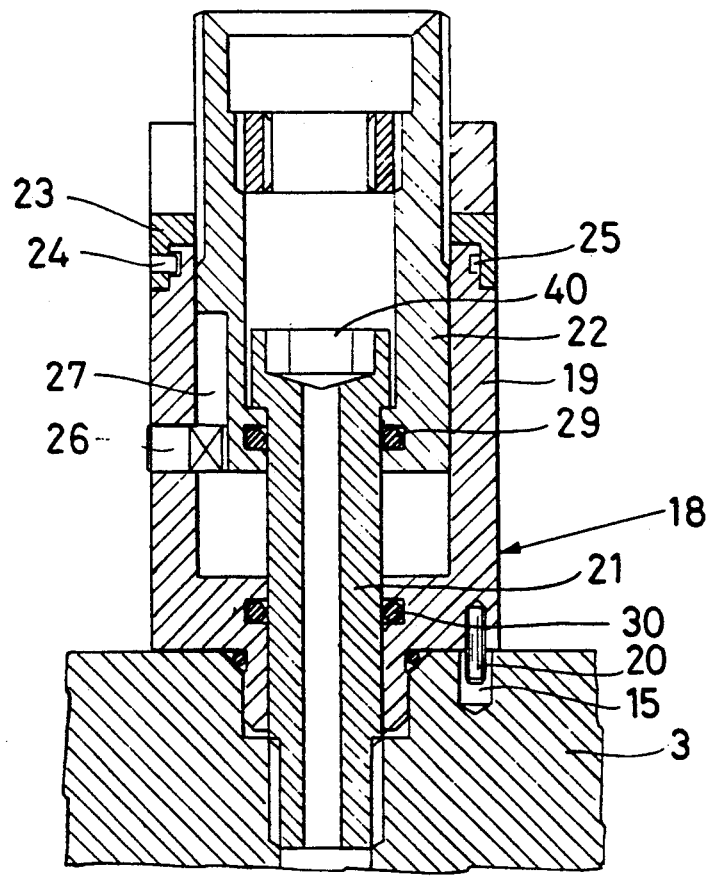
FIG. 2 shows the axial sectional view of an anchoring element which is adjustable in height, applied directly to a supporting pallet.

There is shown in FIG. 1, above the first anchoring element 1 a second anchoring element 18 that is adjustable in height, which, as an alternative, as shown in FIG. 2, can also be fitted directly onto the pallet 3. The second anchoring element 18 comprises an internally hollow external casing 19, provided with a fastening pin 20 which can be inserted into an upper cavity 35 of the underlying anchoring element 1 or in a cavity 15 of the pallet 3 for the definition of a pre-set angular orientation of the second modular element 18. There is inserted in the casing 19 an internally hollow threaded screw 21 having a hexagonal socket head 40 which, as opposed to the similar screw 2 of the first modular element, inserts itself into the bushing 37 by screwing itself onto its internal threads 38, so as to clamp not the casing 19 directly, but an internal casing 22 which is axially slidable in the external casing 19 and provided with external threads 70 engaged with a ring nut 23, in turn rotatably guided by the casing 19 but prevented from moving axially with respect to it, by a pin 24 that is engaged in a circumferential groove 25 of the same casing 19. The internal casing 22 is prevented from rotating with respect to the casing 19 by a pin 26 that is engaged in a circumferential groove 27 of the same casing 22. There is inserted in the cylindrical cavity 63 of the casing 22, a bushing 13, having internal threads 11 which participates in the formation of the seat for a corresponding fastening screw with a hexagonal socket head, of a third anchoring element 10, or of an active component of a clamping fixture (again, not shown). Two seals 29, 30 prevent the clamping fixture's control fluid from flowing out of the casing 19. The adjustment in height of the element 22 is carried out by loosening the screw 21, rotating the ring nut 23 and then tightening the screw 21 again.

On the second height-adjustable, anchoring element 18 it is possible to superimpose, as shown in FIG. 1, a third anchoring element 10 adjustable in angular orientation, which has an external casing 16 having the same internally hollow structure of the casing 4 of the first anchoring element 1 and which terminates with a tang 32 which is, inserted with small clearance, in a cylindrical cavity 33 of the underlying anchoring element 18 in a manner altogether similar way in which the tang 5 is inserted in the cavity 6. Fastening is assured by a hollow screw 31 with a hexagonal socket head 9, screwed into the threaded bushing 13 of the underlying anchoring element 18. A gasket 34 in the proximity of the cylindrical cavity 33 ensures the seal of the clamping fixture's control fluid. The casing 16 of the anchoring element 10, whose height could be other than that of the casing 4, can be angularly oriented so as to correspondingly orient the clamping fixture's component (again not shown), which shall be mounted above it.

At the upper extremity of the casing 16, there is provided a cavity 36 which is similar to the cavity 8 of the anchoring element 1, and in which there is located a bushing 28 which is, in turn, provided with internal threads 58 and externally clamped into the casing 16.

It is evident that the anchoring elements 1, 18, 10 can be associated in different combinations with one another. In particular, the number of the anchoring elements 1 can vary in relation to the desired height of the piece to be clamped.

If only an adjustment of height is desired or, as subsequently described, an active component is used which is adjustable in angular orientation, the anchoring element 10 can be omitted.

In such case, the component of the clamping fixture of the piece to be machined can be applied directly on an anchoring element 1.

If, on the other hand, an adjustment of height is required, but the piece to be clamped is not particularly tall, it is possible, as illustrated in FIG. 2, to apply the anchoring element 18 directly to the pallet 3.

In all cases, the internal holes of the anchoring elements allow the fluid arriving in the cavity 6 of channel 80 to reach the active component (again, not shown) for the desired clamping action.

It should be noted that use of the apparatus of the present invention allows the execution of an accurate adjustment, due to the fact that the adjustment means 10, 18 are far from the pallet 3 and near the clamping fixture's active component (not shown).

With reference to the example of a more complete combination of anchoring elements illustrated in FIG. 1, during the disassembling stage it is sufficient to unscrew the screw 31 by inserting a wrench through the cavity of the internal casing 36, then to unscrew the screw 21 by inserting the wrench in the cavity of the casing 22, and lastly to unscrew the screw 2 by inserting the wrench in the cavity of the casing 4. During the unscrewing stage of screws 31, 21 and 2, the pins 20 and 14 in the cavities 35 and 15 keep the anchoring elements 18 and 1 clamped, preventing their undesired removal together with the clamping fixture's active component located immediately above.

Figure 3:
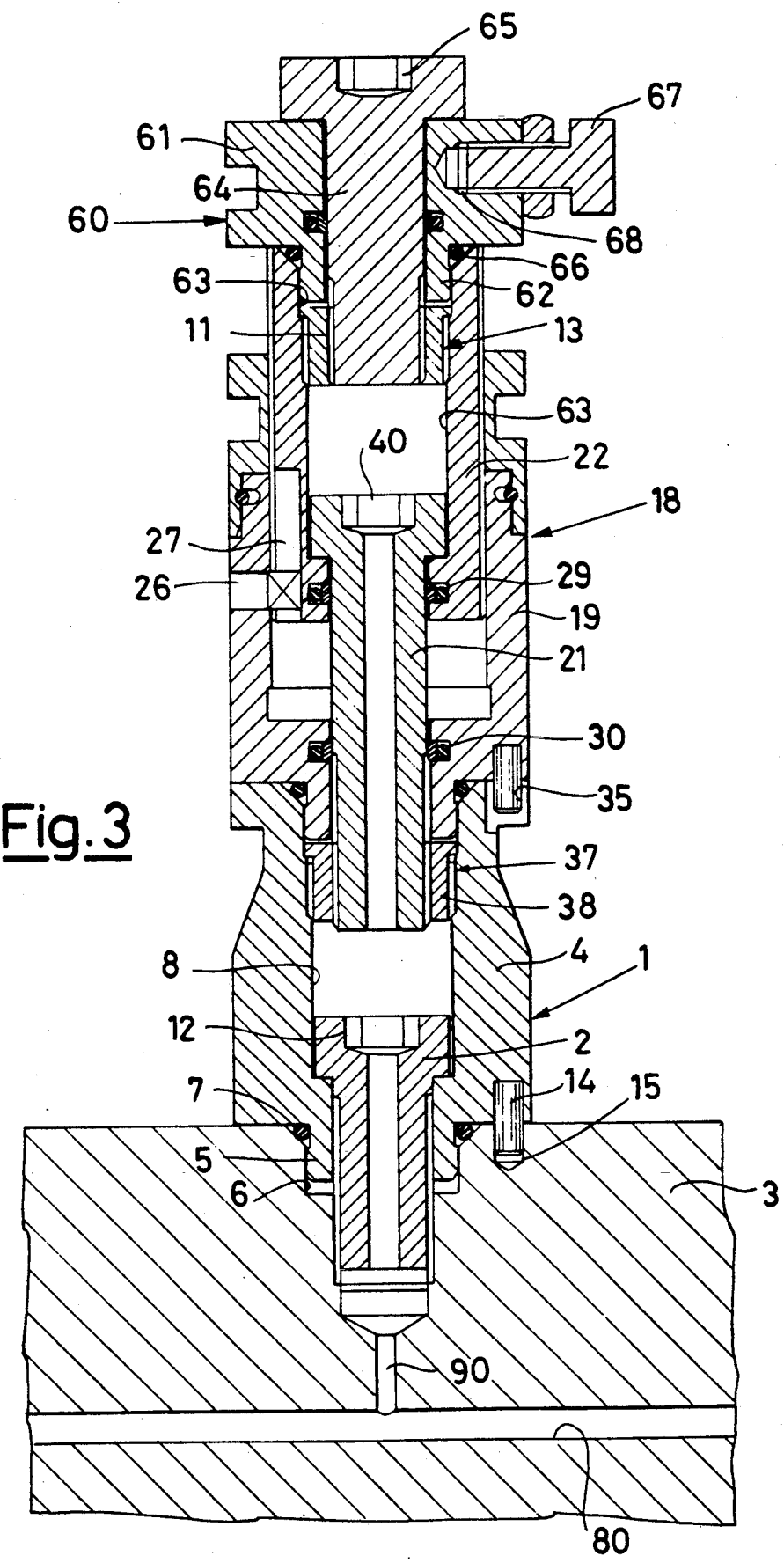
FIG. 3 shows the axial sectional view of an active component which is adjustable in angular orientation, applied to an anchoring element which is adjustable in height which is in turn, applied to a first anchoring element which is applied directly to a supporting pallet.

With reference to FIG. 3, above the set of the first and second anchoring elements 1 and 18, it is possible to place an active component that is adjustable in angular orientation. The latter active component, indicated as a whole by the numeral 60, comprises an internally hollow casing 61 terminating with a lower tang 62 inserted with small clearance in a cylindrical cavity 63 of the height-adjustable element 18. In the casing 61, and in the tang 62 there is inserted a screw 64 with a hexagonal socket head 65, which is screwed into the internally threaded bush 13 of the underlying anchoring element 18. A sealing gasket 66 is situated between the casing 61 and the internally hollow casing 22 of the height-adjustable element 18.

The casing 61 of the component 60, provided by way of an example with an operational part constituted by a lateral pin 67 screwed into a blind hole 68, may be adjusted in angular orientation. The adjustment is carried out by loosening the screw 64 and by rotating the casing 61 until it is made to reach the desired angular position. Finally, the position is fixed by again tightening the screw 64.

I claim:

1. A modular anchoring element set for mounting a fluid-operated workpiece-clamping element onto a supporting pallet, so that an operation such as machining can be conducted on a workpiece while the workpiece is clamped by the workpiece-clamping element onto the supporting pallet, the pallet being provided internally with a channel for communicating fluid pressure, which channel communicates with an upwardly opening cylindrical cavity provided in a support surface on the pallet, with which cavity there is associated on said pallet a first, vertically accessible anti-rotation locking means, said cylindrical cavity being provided, below said support surface, with a band of internal threading, and the fluid-operated workpiece-clamping element being configured to mount in said cylindrical cavity, while being supported on said support surface, by being threadedly engaged with said band of internal threading, by a structure through which fluid pressure can operatively communicate between said channel and a fluid-operated clamp externally provided on said workpiece-clamping element, said modular anchoring element set comprising:

at least one anchoring element in said set vertically, operably interposable between said supporting pallet and fluid-operated workpiece-clamping element so that said clamp is carried at a higher level above said support surface than when said structure of said workpiece clamping element is mounted directly in said cylindrical cavity of said supporting pallet, yet remains fluid-operable from said pallet by fluid pressure communicated through said modular anchoring set; each element in said set including: an upright tubular casing means having a vertical throughbore; a downwardly projecting tubularly cylindrical tang sized to be coaxially received in said cylindrical cavity; a downwardly facing annular shoulder arranged to engage said support surface; means coaxially providing an upwardly facing annular shoulder in said throughbore at a first, lower level; means coaxially providing a band of internal threading in said throughbore at a second, higher level which is disposed below an upper end support surface provided on said tubular casing means; and a tubular, externally threaded screw having an enlarged head provided with an upwardly accessible wrenching socket for permitting the screw to be turned for tightening and loosening the screw; the screw head having a downwardly facing shoulder arranged to engage said upwardly facing annular shoulder in said throughbore; the screw having an externally threaded shank sized to threadedly engage in said band of internal threading of said cylindrical cavity of said supporting pallet;

one of said anchoring elements in said set being a lowermost anchoring element; said lowermost anchoring element further including a second, vertically accessible anti-rotation locking means, engageable with said first, vertically accessible anti-rotation locking means, for effectively preventing when mutually engaged, rotation of the respective said tubularly cylindrical tang relative to said support surface of said pallet when said downwardly facing shoulder on the respective said tubular screw is tightened against the respective said upwardly facing shoulder in the respective said throughbore; and one of said anchoring elements in said set further including means for adjustably vertically axially lengthening and shortening that anchoring element between opposite ends thereof yet preventing rotation of an upper end thereof relative to a lower end thereof.

2. A modular anchoring element set for mounting a fluid-operated workpiece-clamping element onto a supporting pallet, so that an operation such as machining can be conducted on a workpiece while the workpiece is clamped by the workpiece-clamping element onto the supporting pallet, the pallet being provided internally with a channel for communicating fluid pressure, which channel communicates with an upwardly opening cylindrical cavity provided in a support surface on the pallet, with which cavity there is associated on said pallet a first, vertically accessible anti-rotation locking means, said cylindrical cavity being provided, below said support surface, with a band of internal threading, and the fluid-operated workpiece-clamping element being configured to mount in said cylindrical cavity, while being supported on said support surface, by being threadedly engaged with said band of internal threading, by a structure through which fluid pressure can operatively communicate between said channel and a fluid-operated clamp externally provided on said workpiece-clamping element, said modular anchoring element set comprising:

at least one anchoring element in said set vertically, operably interposable between said supporting pallet and fluid-operated workpiece-clamping element so that said clamp is carried at a higher level above said support surface than when said structure of said workpiece clamping element is mounted directly in said cylindrical cavity of said supporting pallet, yet remains fluid-operable from said pallet by fluid pressure communicated through said modular anchoring set; each element in said set including: an upright tubular casing means having a vertical throughbore; a downwardly projecting tubularly cylindrical tang sized to be coaxially received in said cylindrical cavity; a downwardly facing annular shoulder arranged to engage said support surface; means coaxially providing an upwardly facing annular shoulder in said throughbore at a first, lower level; means coaxially providing a band of internal threading in said throughbore at a second, higher level which is disposed below an upper end support surface provided on said tubular casing means; and a tubular, externally threaded screw having an enlarged head provided with an upwardly accessible wrenching socket for permitting the screw to be turned for tightening and loosening the screw; the screw head having a downwardly facing shoulder arranged to engage said upwardly facing annular shoulder in said throughbore; the screw having an externally threaded shank sized to threadedly engage in said band of internal threading of said cylindrical cavity of said supporting pallet;

one of said anchoring elements in said set being a lowermost anchoring element; said lowermost anchoring element further including a second, vertically accessible anti-rotation locking means, engageable with said first, vertically accessible anti-rotation locking means, for effectively preventing when mutually engaged, rotation of the respective said tubularly cylindrical tang relative to said support surface of said pallet when said downwardly facing shoulder on the respective said tubular screw is tightened against the respective said upwardly facing shoulder in the respective said throughbore; and one of said anchoring elements in said set further including means for permitting rotation of said tubularly cylindrical tang thereof relative to said support surface of said pallet when said tubular screw thereof is loosened sufficiently as to permit the upwardly facing shoulder in the respective said throughbore thereof to turn relative to the downwardly facing shoulder on the respective said tubular screw thereof, without substantially changing the axial length of said further anchoring element.

3. A modular anchoring element set for mounting a fluid-operated workpiece-clamping element onto a supporting pallet, so that an operation such as machining can be conducted on a workpiece while the workpiece is clamped by the workpiece-clamping element onto the supporting pallet, the pallet being provided internally with a channel for communicating fluid pressure, which channel communicates with an upwardly opening cylindrical cavity provided in a support surface on the pallet, with which cavity there is associated on said pallet a first, vertically accessible anti-rotation locking means, said cylindrical cavity being provided, below said support surface, with a band of internal threading, and the fluid-operated workpiece-clamping element being configured to mount in said cylindrical cavity, while being supported on said support surface, by being threadedly engaged with said band of internal threading, by a structure through which fluid pressure can operatively communicate between said channel and a fluid-operated clamp externally provided on said workpiece-clamping element, said modular anchoring element set comprising:

at least one anchoring element in said set vertically, operably interposable between said supporting pallet and fluid-operated workpiece-clamping element so that said clamp is carried at a higher level above said support surface than when said structure of said workpiece clamping element is mounted directly in said cylindrical cavity of said supporting pallet, yet remains fluid-operable from said pallet by fluid pressure communicated through said modular anchoring set; each element in said set including: an upright tubular casing means having a vertical throughbore; a downwardly projecting tubularly cylindrical tang sized to be coaxially received in said cylindrical cavity; a downwardly facing annular shoulder arranged to engage said support surface; means coaxially providing an upwardly facing annular shoulder in said throughbore at a first, lower level; means coaxially providing a band of internal threading in said throughbore at a second, higher level which is disposed below an upper end support surface provided on said tubular casing means; and a tubular, externally threaded screw having an enlarged head provided with an upwardly accessible wrenching socket for permitting the screw to be turned for tightening and loosening the screw; the screw head having a downwardly facing shoulder arranged to engage said upwardly facing annular shoulder in said throughbore; the screw having an externally threaded shank sized to threadedly engage in said band of internal threading of said cylindrical cavity of said supporting pallet;

one of said anchoring elements in said set being a lowermost anchoring element; said lowermost anchoring element further including a second, vertically accessible anti-rotation locking means, engageable with said first, vertically accessible anti-rotation locking means, for effectively preventing when mutually engaged, rotation of the respective said tubularly cylindrical tang relative to said support surface of said pallet when said downwardly facing shoulder on the respective said tubular screw is tightened against the respective said upwardly facing shoulder in the respective said throughbore;

(a) one of said anchoring elements in said set further including means for adjustably vertically axially lengthening and shortening that anchoring element between opposite ends thereof yet preventing rotation of an upper end thereof relative to a lower end thereof; and (b) a second anchoring element in said set further including means for permitting rotation of said tubularly cylindrical tang thereof relative to said support surface of said pallet when said tubular screw thereof is loosened sufficiently as to permit the upwardly facing shoulder in the respective said throughbore thereof to turn relative to the downwardly facing shoulder on the respective said tubular screw thereof, without substantially changing the axial length of said second anchoring element;

said modular anchoring elements of said set being interconnected in series with the anchoring element of (a) directly surmounting the second anchoring element of (b).

4. The modular anchoring element set of claim 3, wherein:
the anchoring element of (a) constitutes said lowermost anchoring element of said set.

5. The modular anchoring element set of claim 3, wherein:
said set comprises three anchoring elements, in which the anchoring element of (a) directly surmounts said lowermost anchoring element; and
further comprises first and second vertically accessible anti-rotation locking means respectively on said lowermost anchoring element and the anchoring element of (a), which are engaged for preventing rotation of said anchoring element of (a) relative to said lowermost anchoring element.

* * * * *